April 30, 1940.  G. W. JOHNSON  2,199,134
AUTOMOBILE AWNING
Filed July 13, 1937

INVENTOR.
George W. Johnson
BY Hovey & Hamilton
ATTORNEYS

Patented Apr. 30, 1940

2,199,134

UNITED STATES PATENT OFFICE 2,199,134

AUTOMOBILE AWNING

George W. Johnson, Kansas City, Mo.

Application July 13, 1937, Serial No. 153,320

1 Claim. (Cl. 296—44)

This invention relates to awnings of the general type constructed to be used in connection with automobile windows, and the primary object is the provision of such a structure as will uniquely combine with the conventional window casing of an automobile.

One of the important aims of the invention is to provide a rigid or sheet metal awning structure which has means for entering the window casing groove of an automobile so that the window glass guide in said groove may be engaged to securely hold the awning in operative position.

A yet further object of the invention is the provision of an automobile awning of the aforementioned character, which has a plurality of articulated panels swingably secured to the outer longitudinal edge of the awning body in such manner as to augment, when desired, the awning body.

Other and more minor objects of the invention will appear during the course of the following specification, referring to the accompanying drawing, and such objects include the employment of a layer of heat insulating material on the normally inner faces of awning body and panels and the use of specially formed detents on a portion of the awning which is adjacent to the window glass guide. In the drawing.

Figure 1:
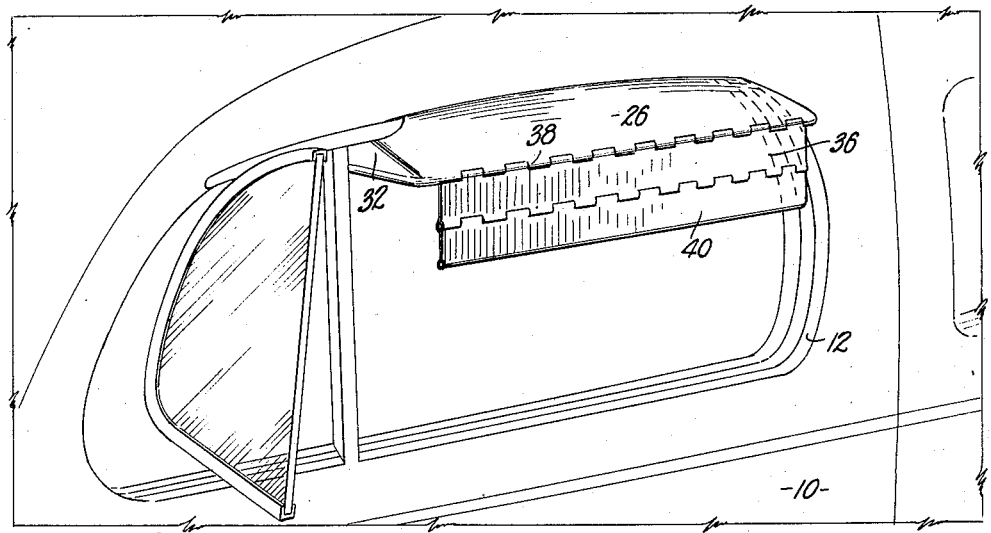
Figure 1 is a perspective view of a portion of an automobile, showing an awning made in accordance with this invention in operative position.
Figure 2:
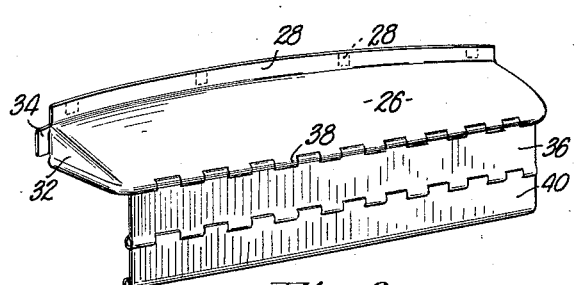
Fig. 2 is a perspective view of the awning entirely removed from the operative position.
Figure 3:
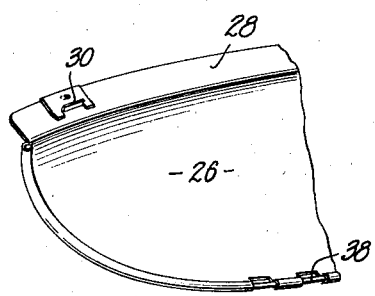
Fig. 3 is an enlarged, fragmentary, perspective view of a portion of the awning body.
Figures 4, 5, 6, 7:
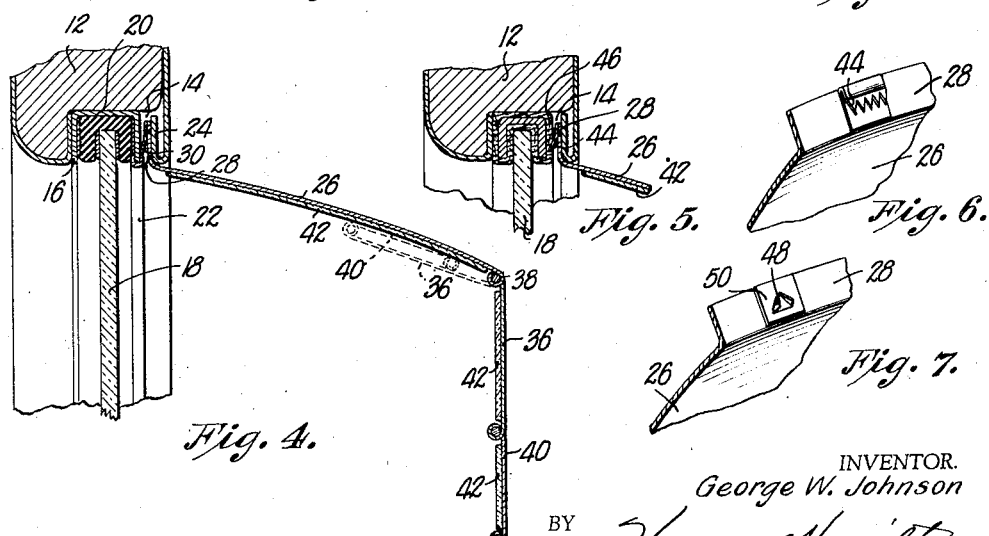
Fig. 4 is a fragmentary, detailed, sectional view through a portion of the automobile body and through the awning structure showing the same in position.
Fig. 5 is a similar view to Fig. 4, but showing a modified form of the invention in use with a slightly different type of window casing groove, and, Figs. 6 and 7 are perspective views of modified forms of detents, which may be employed in connection with the awning.

An automobile body 10 is usually constructed to have a window casing 12, that is provided with a casing groove 14, formed substantially as shown in Figs. 4 and 5. This casing groove 14 receives a window glass guide that may be formed as illustrated in either Fig. 4 or 5, and it is between such window glass guide channel 16 and one wall of window casing 12 that the awning embodying the preferred form of the invention might be placed.

Reference to Fig. 4 will indicate the specific type of window structure that is commonly employed. Window glass 18 directly engages a resilient rubber channel 20, which is in turn held in channel 16 that has a bead or enlarged portion 22 along one edge adjacent the sheet metal wall 24 that serves as a part of window casing 12.

The awning per se is preferably made of sheet metal and formed to present a rigid body 26 that has a flange 28 integral therewith along one longitudinal edge thereof. This flange is provided with a number of detents in the form of ears 30, which should extend downwardly and outwardly from the plane in which flange 28 is normally situated. These ears 30 are resilient and snap behind the bead 22 to secure the flanged portion of the awning against displacement.

The other or outer longitudinal edge of body 26 has swingably secured thereto a panel 36, or sheet metal of similar material which, when in operative position, augments or extends the area of body 26 to a desired degree. This panel 36 is hingedly attached to body 26 by suitable hinge structure 38, such as illustrated in Figs. 1 to 4 inclusive. In some instances it is desirable to provide more than one panel 36, and if so, additional panels 40 may be hinged to the first mentioned panel 36. These panels may be disposed at any desired angle other than those illustrated, so as to shade the occupant of the automobile, and the normally inner or under side of body 26 and panels 36 and 40 is covered by a sheet of insulating material 42, which may be in the form of a sheet of asbestos or other fibrous insulating substance. Panels 36 and 40 are folded as shown in the dotted lines of Fig. 2 when not in use.

Fig. 5 illustrates that kind of window glass guide which is made of felt or other fibrous material. No metallic channel such as 16 of Fig. 4 is present in this structure, and the invention contemplates the use of ears 44, such as shown in Fig. 6, when the felt or fibrous guide is encountered. These ears 44 are clearly illustrated in Fig. 6, and are resilient and sharpened so that they pierce at least a part of the fibrous channel 46.

Another type of detent is shown in Fig. 7. The ears 48 in this instance are struck from a piece 50, spot-welded to flange 28 formed on the awning body 26.

While many forms of construction have been shown, it is important here to mention that other types of detents may be employed so long as the broad concept of holding the awning in place by forcing a portion thereof into the casing groove between the window glass guide and one wall of the groove is followed.

The awning may be made of various materials, finished to match the automobile with which it is associated, and moved to and from operative position without the employment of special tools or the like. When removing the awning from the positions shown for example in Figs. 4 and 5, it is merely necessary to lower the glass 18, compress window glass guide channel 16 or 46, as the case may be, and draw flange 28 from within the casing groove 14.

Having thus described the invention, what is claimed as new and desired to be secured by Letters Patent is:

An awning for automobiles of the type having a resilient channel to receive the marginal edge of the window glass and a metal channel provided with a bead forming a shoulder along one leg thereof, said channels being nested and in a groove in the window casing, said awning comprising a metallic body; a laterally extending flange along one longitudinal edge of the body projecting into the groove of the window casing when the awning is in place; and a plurality of outwardly and downwardly inclined ears secured to the flange on the side opposite to the body to hold the awning in position, said ears having the free ends thereof in engagement with the shoulder of the bead when the window casing is in engagement with the outer face of the flange and said body along the upper face thereof, along the line of juncture between the flange and body whereby to retain the awning in normal position, said ears having a straight bearing edge.

GEORGE W. JOHNSON.